United States Patent [19]

Crane et al.

[11] 4,086,029
[45] Apr. 25, 1978

[54] METHOD AND APPARATUS FOR FLUSHING THE PLUNGER OF A POSITIVE DISPLACEMENT PUMP

[75] Inventors: Robert M. Crane, Dallas; Fletcher H. Redwine, Garland, both of Tex.

[73] Assignee: United States Steel Corporation, Pittsburgh, Pa.

[21] Appl. No.: 747,569

[22] Filed: Dec. 6, 1976

[51] Int. Cl.² .................. F01B 31/00; F04B 39/00
[52] U.S. Cl. ................................. 417/53; 417/437; 92/86.5
[58] Field of Search .......... 417/430, 53, 437, 900; 92/86.5; 277/3

[56] References Cited

U.S. PATENT DOCUMENTS

| | | | |
|---|---|---|---|
| 1,647,425 | 11/1927 | Wise | 417/900 |
| 1,943,578 | 1/1934 | Bigelow et al. | 277/3 |
| 1,996,780 | 4/1935 | Wheeler | 277/3 |
| 2,466,025 | 4/1949 | Hanson | 277/3 |
| 2,678,609 | 5/1954 | Ashton | 92/86.5 |
| 3,128,941 | 4/1964 | Waibel | 92/86.5 |
| 3,179,057 | 4/1965 | Cosner | 277/3 |
| 3,266,435 | 8/1966 | Smith | 417/900 |
| 3,542,374 | 11/1970 | Neilson | 277/3 |
| 3,749,529 | 7/1973 | Cornelsen | 92/86.5 |

*Primary Examiner*—William L. Freeh
*Attorney, Agent, or Firm*—Walter P. Wood

[57] ABSTRACT

A method and apparatus for flushing the plunger of a positive displacement pump which handles a suspension of abrasive particles. Flush liquid is introduced at two or more locations to the packing surrounding the pump plunger. The larger volume of flush liquid is introduced in front of the packing to wash abrasive particles from the plunger in the usual manner. A smaller volume is introduced intermediate front and back sets of packing rings. Initially the back packing rings provide the seal for the plunger, but when they wear, flush liquid from between the two sets of packing rings leaks past the back packing rings to furnish an indication of the wear. The front packing rings now provide the seal, and it is known that the back packing rings should be replaced.

9 Claims, 2 Drawing Figures

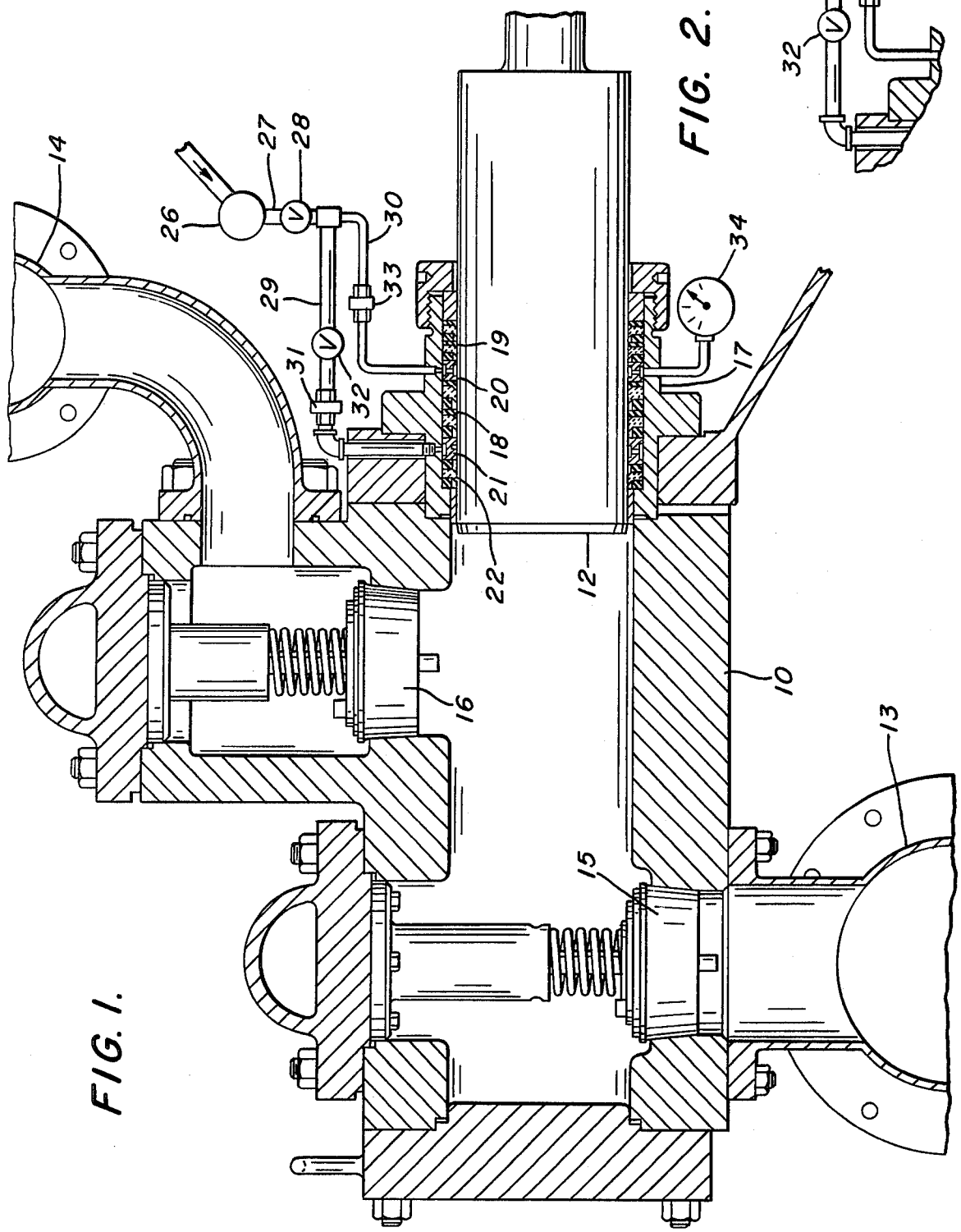

METHOD AND APPARATUS FOR FLUSHING THE PLUNGER OF A POSITIVE DISPLACEMENT PUMP

This invention relates to an improved method and apparatus for flushing the plunger of a positive displacement pump.

Although the invention is not thus limited, our flushing method and apparatus are particularly useful as applied to slurry pumps which handle water suspensions of abrasive particles. A conventional positive displacement slurry pump includes a plurality of cylinders, respective plungers in each cylinder, and packing rings surrounding the plungers where they enter the cylinders. In operating such pumps, it is conventional to flush the plungers with clean water or other flush liquid applied immediately in front of the packing rings to wash away abrasive particles and prevent such particles from being drawn into the packing during suction strokes of the plungers.

Several types of flush systems have been used heretofore, among which are:

(a) Low pressure flush, in which a small quantity of clean flush liquid flows around the plunger through a narrow annular passage in the cylinder wall only during suction strokes of the plunger. A check valve in the flush liquid supply line prevents back flow during discharge strokes.

(b) Synchronized flush, in which a small flush pump is synchronized to discharge flush liquid into the annular area ahead of the packing during suction strokes of the slurry pump.

(c) High pressure flush, in which clean flush liquid is introduced to an annular passage around the plunger at a pressure slightly higher than the pump discharge pressure. This system enables a large portion of the flush liquid to flow around the plunger during suction strokes when the pressure differential is greatest and the flush liquid is needed to exclude abrasive particles from the packing. A small flow is maintained during discharge strokes, thus eliminating need for check valves or synchronizing means and assuring clean packing at all times.

An object of the present invention is to provide an improved flushing method and apparatus of the high pressure type in which we effectively wash particles from a pump plunger and exclude them from the packing and at the same time obtain a ready indication of the condition of the packing.

A further object is to provide an improved flushing method and apparatus in which we introduce liquid at two or more locations, a larger volume being introduced at the usual location to wash particles from the pump plunger, and a smaller volume intermediate the length of the packing to afford an indication of the condition of the packing.

In the drawing:

FIG. 1 is a vertical sectional view through one cylinder of a positive displacement pump equipped with our flushing apparatus; and FIG. 2 is a diagrammatic view of a modified arrangement for supplying flush liquid to the pump.

FIG. 1 shows one cylinder 10 of a positive displacement pump, such as may be used for pumping slurries of abrasive particles suspended in water. The pump includes a plunger 12 arranged for reciprocable movement within the cylinder, suction and discharge manifolds 13 and 14, and suction and discharge valves 15 and 16. A stuffing box 17 surrounds the plunger, and contains front and back sets of packing rings 18 and 19, an intermediate lantern ring 20 between the two sets of packing rings, a front lantern ring 21, and spreader rings 22 in front of the lantern ring 21. A suitable drive (not shown) is connected to the plunger 12 to reciprocate it out of and into the cylinder 10 through suction and discharge strokes. The pump illustrated is conventional, apart from the flushing apparatus and some of the packing details, and hence is not described in detail.

The flushing apparatus of the present invention includes a flush manifold 26 from which extends a pipe 27 preferably containing a check valve 28. Two branch pipes 29 and 30 extend from pipe 27 beyond the check valve. the larger branch 29 is connected into the stuffing box 17 in line with the front lantern ring 21, and contains a relatively large orifice 31 and a check valve 32. The smaller branch 30 is connected into the stuffing box in line with the intermediate lantern ring 20 and contains a relatively small orifice 33. Preferably we connect a pressure measuring device 34, illustrated as a gauge, to the stuffing box 17 also in line with the intermediate lantern ring. The flush manifold 26 is connected to a suitable source of flush liquid at a pressure higher than the discharge pressure of the pump.

FIG. 2 shows a modification in which we locate the large orifice 31 in pipe 27 upstream of the branch pipes 29 and 30. This modification assures that the flow through the small orifice 32 is relatively low without need for the small orifice to be so small that it readily clogs.

According to our flushing method, the larger branch pipe 29 and orifice 31 carry a relatively large volume of flush liquid from the manifold 26 to the stuffing box 17. This liquid serves to wash particles from the plunger 12 during its suction strokes and thus acts in the usual manner to prevent the particles from being drawn into the front set of packing rings 18. The smaller branch pipe 30 and orifice 33 carry a relatively small volume of flush liquid to the intermediate lantern ring 20. The pressure measuring device 34 indicates the pressure at this ring. The check valves 28 and 32 prevent flush liquid from backing up during discharge strokes of the plunger. The check valve 32 also prevents slurry from entering the back section of the flush system if the packing fails or if there is a malfunction in the flush system.

Initially there is approximately equal pressure at opposite sides of the front set of packing rings 18, while there is a pressure differential at opposite sides of the back set of packing rings 19, since the latter are subject only to atmospheric pressure at their back end. Under these conditions the back packing rings provide the seal around the plunger. Hence they are the first to wear and eventually begin to leak. Nevertheless they continue to provide the seal until they leak at a greater rate than flush liquid is delivered to the intermediate lantern ring 20. At this stage the pressure at the intermediate lantern ring drops and there is a pressure differential at opposite sides of the front set of packing rings 18. The front packing rings now provide a seal for the plunger 12.

We can detect the point at which the back packing rings 19 cease to provide a seal in several ways. We may detect it by observing an increase in flow through the branch pipe 30 supplying flush liquid to the intermediate lantern ring 20. We may detect it by observing a pressure drop at the intermediate ring, as indicated by the pressure gauge 34. We may also detect it by observing the volume of liquid leaking past the back packing rings. By observing the deterioration of the back packing rings, we can schedule packing replacement while the front packing rings for providing a seal before they wear out.

From the foregoing description it is seen that our invention provides a flushing method and apparatus which effectively wash particles from the plunger of a positive displacement pump and at the same time facilitate determining the state of wear of the plunger packing. The invention enables the packing to be replaced only when necessary without waiting for a total failure to take place.

We claim:

1. In a pumping operation in which a suspension of particles is handled in a positive displacement pump, the plunger of which passes through sets of front and back packing rings as it reciprocates through suction and discharge strokes, an improved method of flushing particles from said plunger, said method comprising introducing a relatively large volume of flush liquid to said plunger at a location in front of said front set of packing rings, introducing a smaller volume of flush liquid at a location between said front and back sets of packing rings, initially maintaining the liquid introduced at the two locations at approximately the same pressure while maintaining the side of said back set of packing rings remote from said front set at a lower pressure, thus relying on said back set of packing rings to provide a seal for said plunger, and when the packing rings of said back set wear and commence to leak, creating a differential in the pressure of the flush liquid introduced at the two locations and relying on said front set of packing rings to provide a seal.

2. A method as defined in claim 1 in which the pressure of flush liquid introduced at the first-named location is greater than the discharge pressure of the pump.

3. A method as defined in claim 1 in which the suspension is a water slurry of abrasive particles and the flush liquid is water.

4. A method as defined in claim 1 comprising a further step of measuring the pressure of liquid introduced between said sets of packing rings.

5. In a positive displacement pump for handling a suspension of particles, which pump includes at least one cylinder, a plunger reciprocable through suction and discharge strokes in said cylinder, a stuffing box carried by said cylinder, and front and back sets of packing rings within said stuffing box surrounding said plunger, the combination therewith of an improved flushing apparatus comprising means for introducing a relatively large volume of flush liquid to said stuffing box at a location in front of said front set of packing rings to wash particles from said plunger and prevent the particles from being drawn into said packing rings, and means for introducing a smaller volume of flush liquid to said stuffing box at a location between said front set of packing rings and said back set of packing rings initially at substantially the same pressure as the liquid introduced at the first-named location, the side of said back set of packing rings remote from said front set being at a lower pressure, whereby said back set of packing rings initially provides a seal for said plunger, said front set of packing rings providing a seal for said plunger after the packing rings of said back set wear and commence to leak and create a differential in the pressure of the flushing liquid introduced at the two locations.

6. A flushing apparatus as defined in claim 5 in which the pressure at which the pressure of flush liquid introduced at the first-named location is greater than the discharge pressure of the pump.

7. A flushing apparatus as defined in claim 5 comprising in addition a front lantern ring in said stuffing box in line with the first-named location at which flush liquid is introduced, and an intermediate lantern ring in said stuffing box between said front set of packing rings and said set in line with the second-named location at which flush liquid is introduced.

8. A flushing apparatus as defined in claim 5 comprising in addition a pressure gauge connected to said stuffing box between said front set of packing rings and said back set.

9. A flushing apparatus as defined in claim 5 wherein the means for introducing flushing liquid includes a flush manifold, a pipe extending from said manifold, a relatively large branch pipe extending from said first-named pipe to said first-named location, a relatively small branch pipe extending from said first-named pipe to said second-named location, a check valve and a relatively large orifice in said first-named pipe, a check valve in said relatively large branch pipe, and a relatively small orifice in said relatively small branch pipe.

* * * * *